United States Patent [19]
Joseph et al.

[11] Patent Number: 5,372,184
[45] Date of Patent: Dec. 13, 1994

[54] HEAT EXCHANGER SEAL APPARATUS

[75] Inventors: Thomas J. Joseph, Milford; John J. Kolodziej, White Lake; Dennis A. Vermette, Westland, all of Mich.

[73] Assignee: Ford Motor Company, Dearborn, Mich.

[21] Appl. No.: 105,569

[22] Filed: Aug. 13, 1993

[51] Int. Cl.⁵ .................................................. F28F 9/00
[52] U.S. Cl. ........................................ 165/67; 49/490.1; 49/493.1
[58] Field of Search ................. 165/41, 67; 49/490.1, 49/493.1

[56] References Cited

U.S. PATENT DOCUMENTS

| | | | |
|---|---|---|---|
| 3,318,409 | 5/1967 | Kiehnle | 165/67 X |
| 3,700,061 | 10/1972 | Hortnagl | 180/68.4 |
| 4,036,288 | 7/1977 | Neveux | 165/69 |
| 4,328,859 | 5/1982 | Bouvot | 165/78 |
| 4,465,124 | 8/1984 | Jacquet et al. | 165/67 |
| 4,482,011 | 11/1984 | Jacquet | 165/67 |
| 4,603,734 | 8/1986 | Heeren et al. | 165/67 |
| 4,618,020 | 10/1986 | Noda et al. | 180/229 |
| 5,042,604 | 8/1991 | Tone et al. | 180/68.4 |
| 5,163,505 | 11/1992 | Hoffman et al. | 165/67 |

*Primary Examiner*—Allen J. Flanigan
*Attorney, Agent, or Firm*—Raymond L. Coppiellie; Roger L. May

[57] ABSTRACT

A seal apparatus for a heat exchanger used in an automotive vehicle is disclosed. The seal apparatus includes a closed loop of flexible material, the loop defining four substantially orthogonal edges configured to contact the respective sides of the heat exchanger. The loop includes a sealing bead, a plurality of locating blocks disposed at predetermined locations on the loop and a strap and tie connector integrally formed with the closed loop for securing the loop onto the heat exchanger.

4 Claims, 2 Drawing Sheets

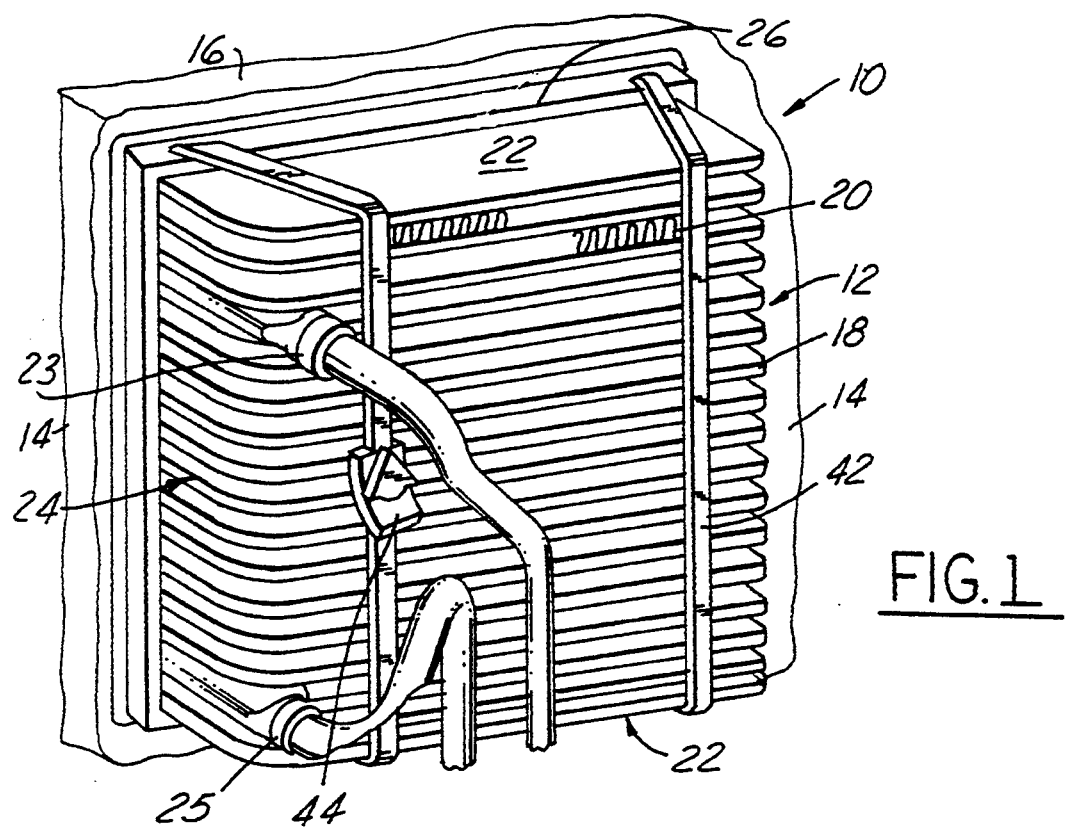
FIG. 1
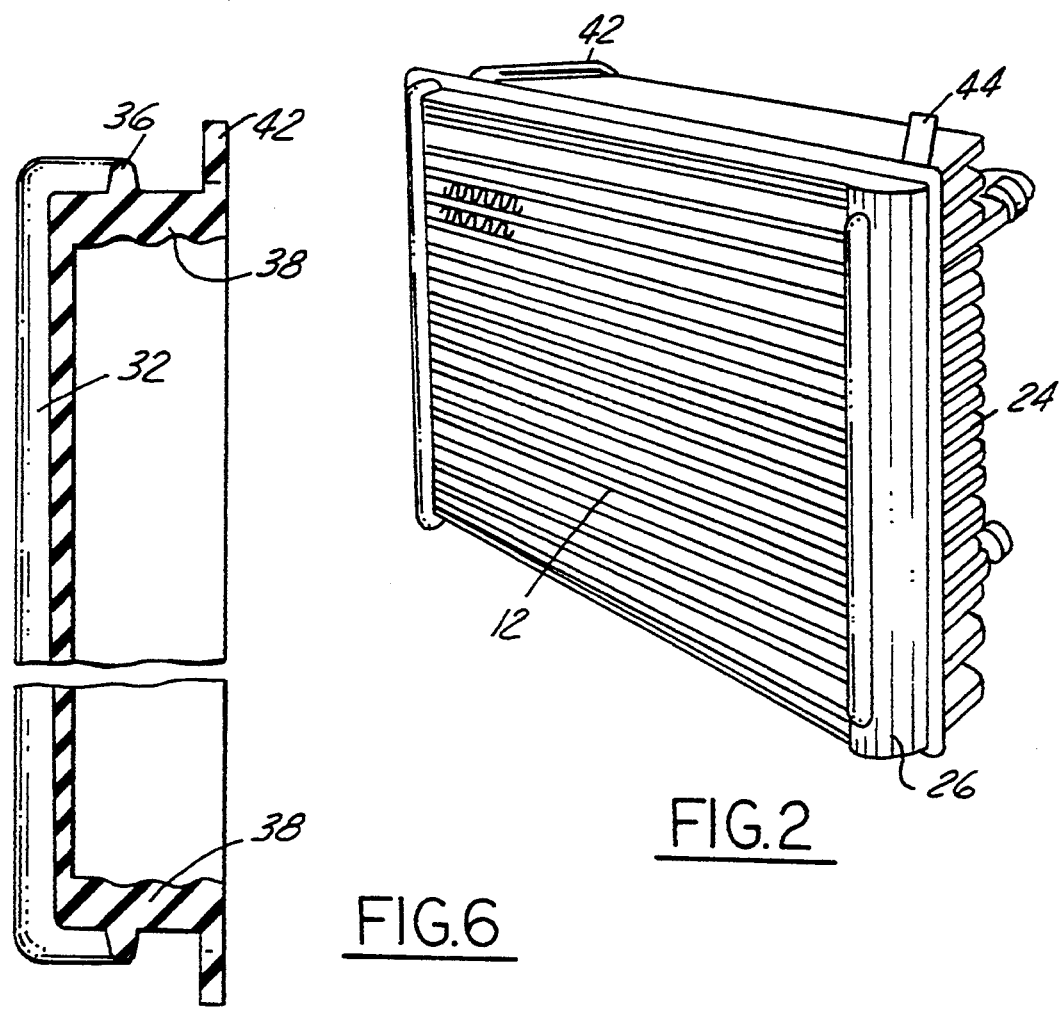
FIG. 6
FIG. 2

HEAT EXCHANGER SEAL APPARATUS

BACKGROUND OF THE INVENTION

1. Field of the Invention

The present invention relates generally to heat exchangers and more particularly to a seal surrounding the heat exchanger which prevents warm air from passing around the heat exchanger and mechanically isolates the heat exchanger within a plastic housing.

2. Background Information

Heat exchangers in the automotive industry, such as evaporators, generally are mounted in a casing within the passenger space or cabin of the motor vehicle. Typically, a seal surrounds the heat exchanger core to prevent warm air from passing around the heat exchanger which could produce condensation within the casing. Activation of the air conditioning system could force this condensation into the passenger space of the vehicle. Obviously, this is an undesirable result and many methods have been proposed to provide better sealing around the heat exchanger core to prevent the occurrence or formation of condensation around the heat exchanger core. For example, U.S. Pat. No. 4,036,288 discloses one such seal for surrounding the radiator of an automotive vehicle, the seal comprising an open loop of closed foamed cell material which is adhesively mounted to the sides of the radiator prior to the radiator being installed into a casing. However, this type of design can be subject to many deleterious effects, such as incorrect or misaligned installation, an incorrect amount of adhesive can be used causing leakage around the seal or forming water pockets, or the adhesive can loosen because of the moisture buildup within the casing and thus the overall purpose and effect of the seal is destroyed.

Therefore, it would be advantageous to provide a sealing apparatus for a heat exchanger which does not rely upon the use of adhesives to secure the seal to the heat exchanger core and which provides sufficient sealing of the heat exchanger core in the housing to prevent warm air from passing therearound and ultimately producing condensation.

SUMMARY OF THE INVENTION

The present invention overcomes the disadvantages of the prior art by providing a sealing apparatus for a heat exchanger used in an automotive vehicle, the heat exchanger having a plurality of interleaved fluid conducting tubes and fins which form a generally rectangular core defining a pair of orthogonal opposed sides. The heat exchanger is mounted in a casing comprising a housing having an open end for receiving the heat exchanger therethrough and a plurality of walls defining a volume for receiving the heat exchanger therein. The sealing apparatus comprises a closed loop of flexible material, the loop defining four substantially orthogonal edges, each edge configured to contact the respective side of the heat exchanger core. The closed loop includes a sealing bead disposed on an outer face of at least one edge thereof, not in contact with the heat exchanger walls, the bead being adapted to contact the interior housing walls of the casing. The loop further includes a plurality of locating blocks disposed at predetermined locations on the loop, the blocks engaging recesses formed in the core to locate the loop in the correct position around the heat exchanger. The closed loop of material further includes lash means integrally formed with the loop for securing the loop onto the heat exchanger, the lash means being operative to overlap at least one face of the heat exchanger core.

The present invention is particularly useful for surrounding an evaporator of an air conditioning system in an automotive vehicle. One advantage of the present invention is to provide a seal around a heat exchanger core which eliminates the use of adhesives to secure the seal to the heat exchanger core and which prevents warm air from passing around the evaporator core, as well as to mechanically isolate the core within the housing to reduce noise, vibration and harshness within the system.

These other objects, features and advantages of the present invention will become apparent from the drawings, detailed description and claims which follow.

BRIEF DESCRIPTION OF THE DRAWINGS

FIG. 1 is a perspective view of a heat exchanger core provided with a sealing apparatus of the present invention and a casing of an automotive air conditioning system.

FIG. 2 is a front elevational view of the heat exchanger core of FIG. 1.

FIG. 6 is a cross-sectional view of the present invention taken along line 6—6 of FIG. 3.

DETAILED DESCRIPTION OF THE PREFERRED EMBODIMENTS

Figure 3:
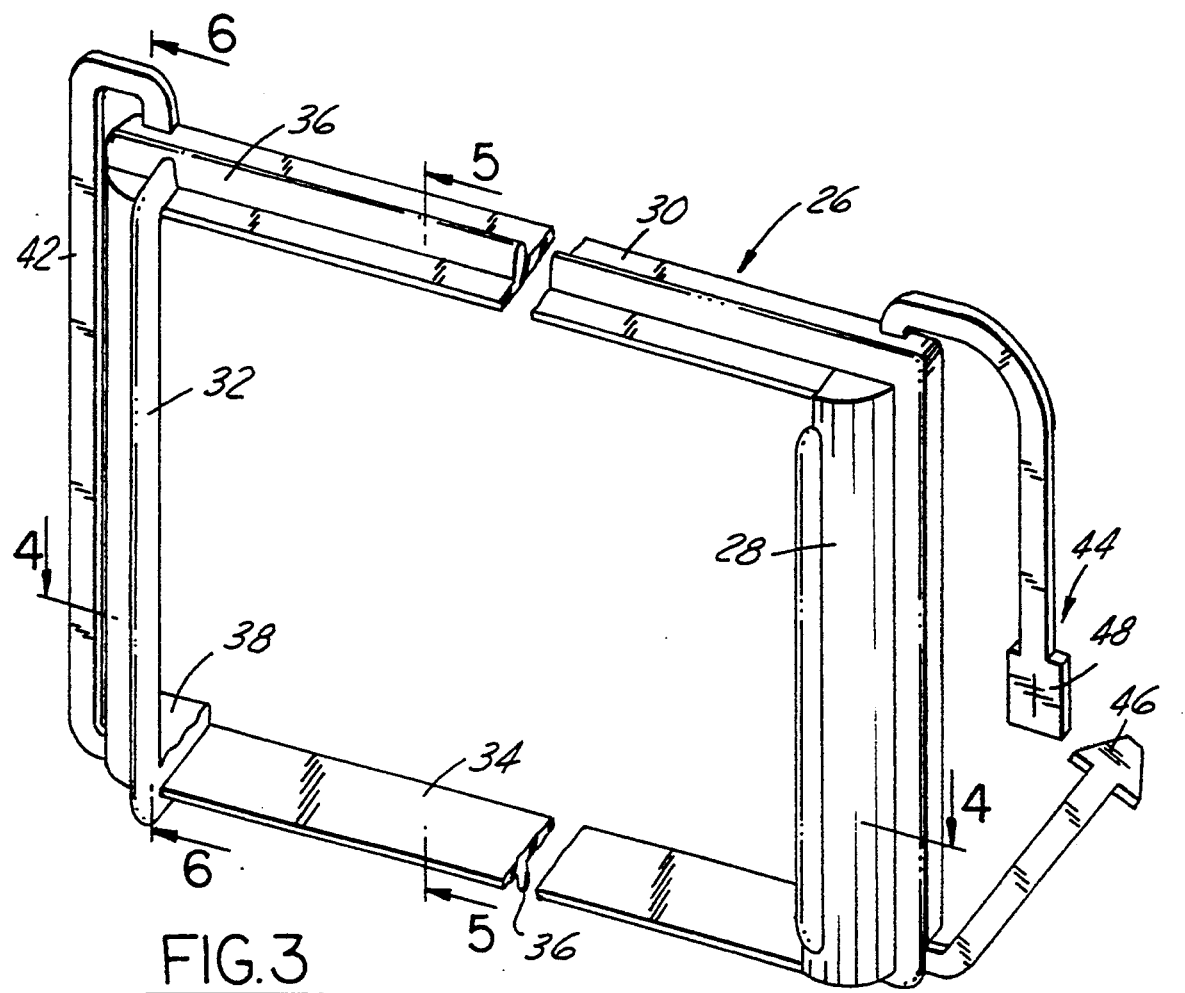
FIG. 3 is a perspective view of the sealing apparatus of the present invention.
Figure 4:
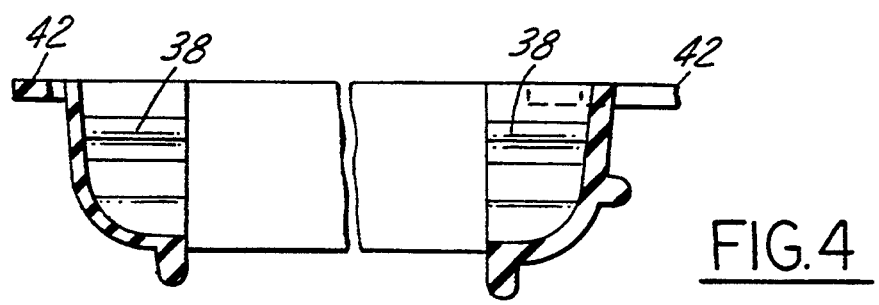
FIG. 4 is a cross-sectional view of the present invention taken along line 4—4 of FIG. 3.
Figure 5:
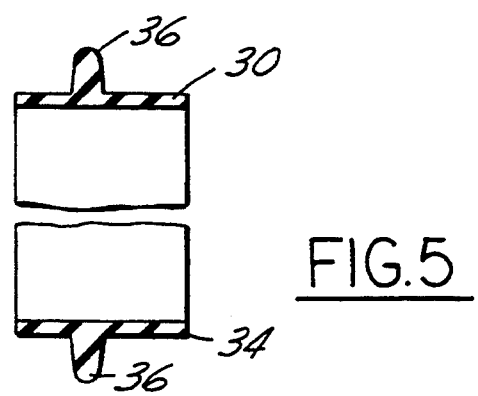
FIG. 5 is a cross-sectional view of the present invention taken along line 5—5 of FIG. 3.

Referring now to the drawings, FIGS. 1 and 2 show a portion of a casing 10 of a heater or air conditioning assembly for the passenger space or cabin of a motor vehicle. The casing 10 may be located in the engine compartment area of the vehicle as well. The casing 10 is made of a molded plastic and receives a heat exchanger 12 therein. As is known in the art, the casing includes a plurality of walls 14 and defines an open end 16 at one end thereof for receiving the heat exchanger 12 therethrough.

As shown in FIG. 1, the heat exchanger 12 comprises an evaporator constructed in a known manner having a plurality of interleaved fluid conducting tubes or plates 18 and fins 20. The plurality of tubes 18 and fins 20 are fabricated to form a generally rectangular core thereby, the core defining a pair of generally orthogonal opposed sides 22, 24. As is further well known in the art, the evaporator includes an inlet port 23 and an outlet port 25 for supplying and removing fluid from the evaporator 12. As will be described in further detail below, a seal 26 according to the present invention surrounds the heat exchanger or evaporator 12 and is interposed between the sides 22, 24 thereof and the walls 14 of the casing 10.

Referring now to FIG. 3, the seal 26 according to the present invention is formed from a closed loop of flexible material and defines four substantially orthogonal edges 28, 30, 32 and 34. Each of these edges 28, 30, 32, 34, contacts a respective side 22, 24 of the evaporator 12 as shown in FIGS. 1 and 2. The loop is formed from a closed cell foamed rubber such as EPDM rubber or a similar material known in the art by a known manufacturing process such as molding. Edges 30, 34 on the closed loop include a sealing bead 36 disposed on an outer face of each edge. The sealing bead 36 contacts the interior of the casing walls 14 when the evaporator 12 is inserted into the casing 10. The bead 36 rolls over against its respective edge upon insertion of the evaporator 12 into the casing 10 to ensure a water-tight seal around the perimetry of the evaporator 12 and the inside face of the walls 14 of the casing 12. The sealing bead 26 prevents warm air from passing around the evaporator 12 to prevent the formation of any condensation within the casing 10.

As further shown in FIGS. 3–6, the seal 26 includes a plurality of locating blocks 38 disposed at predetermined locations on the closed loop. The blocks 38 engage recesses formed in the evaporator so that the seal 26 is correctly positioned around the evaporator 12. As should be apparent to those skilled in the art, the length of the closed loop of the seal 26 of the present invention is slightly less than the total perimeter of the orthogonal sides 22, 24 of the evaporator 12 so that a close tolerance fit of the closed loop is made against each of the sides of the evaporator. By providing the locating blocks 38 and recesses, correct positioning of the seal 26 on the heat exchanger is accomplished with minimal operator error in the placement of the seal.

The seal 26 of the present invention is secured to the heat exchanger or evaporator 12 by the interference fit of the closed loop which has a smaller total length than the external perimeter of the evaporator 12 as well as by a strap 42 and a tie connector 44. The strap 42 and connector 44 comprise lash means which are integrally formed with the closed loop of the flexible material and which secure the loop onto the evaporator 12. The tie connector 44 includes a male end 46 which releasably engages a female end 48. The tie connector 44 is disposed at an end of the loop opposite the strap 42. As shown in FIG. 1, the strap 42 and tie connector 44 overlap at least one of the faces of the evaporator 12 to provide a tight fit of the seal 26 around the perimeter of the evaporator. By providing the lash means as described, the seal 26 according to the present invention can be applied to the evaporator without the need for adhesives which is more economical.

Various other modifications and permutations of the present invention should, no doubt, occur to those skilled in the art. For example, the material used to fabricate the seal of the present invention can be selected from many of a group of known flexible closed cell materials. Therefore, it is the following claims, including all equivalents, which define the scope of the invention.

What is claimed is:

1. A sealing apparatus for a heat exchanger used in an automotive vehicle, said heat exchanger having a plurality of interleaved fluid conducting tubes and fins so as to form a generally rectangular core thereby, said core defining a pair of generally orthogonal opposed sides, said heat exchanger being mounted in a casing comprising a housing having an open end for receiving the heat exchanger therethrough and a plurality of walls defining a volume for receiving the heat exchanger therein, said sealing apparatus comprising:
    a closed loop of flexible material, said loop defining four substantially orthogonal edges, each edge configured to contact a respective side of said core of said heat exchanger, said closed loop including:
    a sealing bead disposed on an outer face of at least one edge thereof not in contact with said heat exchanger, said bead being adapted to contact said housing walls;
    a plurality of locating blocks disposed at predetermined locations on said loop, said blocks being adapted to engage recesses formed in said core to locate said loop in a correct position around said heat exchanger; and
    lash means integrally formed with said closed loop for securing said loop onto said heat exchanger, said lash means being operative to overlap at least one face of said core of said heat exchanger.

2. A sealing apparatus according to claim 1, wherein said lash means comprises a strap disposed at one end of said closed loop and a tie connector having releasably engageable male and female members disposed at an opposite end thereof, said strap and tie connector being operative to surround one side of said core and secure said closed loop thereto.

3. A sealing apparatus for an evaporator used in an air conditioning system of an automotive vehicle, said evaporator having a plurality of interleaved fluid conducting tubes and fins so as to form a generally rectangular core thereby, said core defining a pair of generally orthogonal opposed sides, said evaporator being mounted in a casing comprising a housing having an open end for receiving the evaporator therethrough and a plurality of walls defining a volume for receiving the evaporator therein, said sealing apparatus comprising:
    a closed loop of flexible material of length less than the total perimeter of said core, said loop defining four substantially orthogonal edges, each edge configured to contact a respective side of said core of said evaporator, said closed loop including:
    a sealing bead disposed on an outer face of at least one of said edges thereof not in contact with said evaporator, said bead being adapted to contact said housing walls on an inside surface thereof and prevent moisture from escaping therearound;
    a plurality of locating blocks disposed at predetermined locations on said loop, said blocks being adapted to engage recesses formed in said core to locate said loop in a correct position around said evaporator; and
    a strap disposed at one end of said closed loop and a tie connector having releasably engageable male and female members disposed at an opposite end thereof, said strap and tie connector being integrally formed with said closed loop and being operative to surround one side of said core and secure said closed loop thereto.

4. A sealing apparatus according to claim 3, wherein said closed loop of flexible material is fabricated from a closed cell foamed material.

* * * * *